US006578495B1

(12) United States Patent
Yitts et al.

(10) Patent No.: US 6,578,495 B1
(45) Date of Patent: Jun. 17, 2003

(54) MODULAR LINEAR MOTOR TRACKS AND METHODS OF FABRICATING SAME

(75) Inventors: Anthony A. Yitts, Grafton, MA (US); Alastair D. Taylor, Ayer, MA (US)

(73) Assignee: MagneMotion, Inc., Acton, MA (US)

( * ) Notice: Subject to any disclaimer, the term of this patent is extended or adjusted under 35 U.S.C. 154(b) by 0 days.

(21) Appl. No.: 09/722,068

(22) Filed: Nov. 24, 2000

Related U.S. Application Data

(60) Provisional application No. 60/167,087, filed on Nov. 23, 1999.

(51) Int. Cl.[7] .................................................. B60L 13/00
(52) U.S. Cl. ........................................ 104/292; 310/12
(58) Field of Search ................................ 104/287, 288, 104/292, 298, 290, 291, 294, 23.2; 191/6, 10; 310/12, 13, 14; 425/3, 542

(56) References Cited

U.S. PATENT DOCUMENTS

| | | | |
|---|---|---|---|
| 3,547,041 A | * 12/1970 | Izhelya et al. | ............... 104/148 |
| 3,663,131 A | * 5/1972 | Hegewaldt | ...................... 425/3 |
| 4,444,550 A | 4/1984 | Loubier | |
| 4,800,818 A | 1/1989 | Kawaguchi et al. | |
| 5,072,144 A | * 12/1991 | Saito et al. | .................... 310/12 |
| 5,229,669 A | 7/1993 | Takei | |
| 5,289,088 A | 2/1994 | Andoh | |
| 5,619,078 A | 4/1997 | Boys et al. | |
| 5,668,421 A | 9/1997 | Gladish | |
| 5,701,042 A | 12/1997 | Takei | |

* cited by examiner

*Primary Examiner*—S. Joseph Morano
*Assistant Examiner*—Lars A. Olson
(74) *Attorney, Agent, or Firm*—David J. Powsner; Nutter, McClennen & Fish LLP

(57) ABSTRACT

A module for a linear motor propulsion guideway contains a combination of linear motor propulsion, vehicle guidance, position sensing, communication, and vehicle or pallet running surface subcomponents. These are integrated during the manufacturing into a single component or module for ease of shipping and precision of installation at a site where the guideway is to be installed. A single manufacturing operation is used to position, affix, and encapsulate the selected subcomponent(s) in a module or modules. For example, the component(s) can be designed to be located in a plastic injection mold, typically, a reaction injection mold (RIM), which allows the subcomponent(s) to be positioned, aligned, and encapsulated in a single manufacturing step that has only a several minute cycle time. In this manner positional accuracy among the relationship of the subcomponent(s) can be maintained within a small tolerance (on the order of 0.25 mm) while costs remain very low.

4 Claims, 6 Drawing Sheets

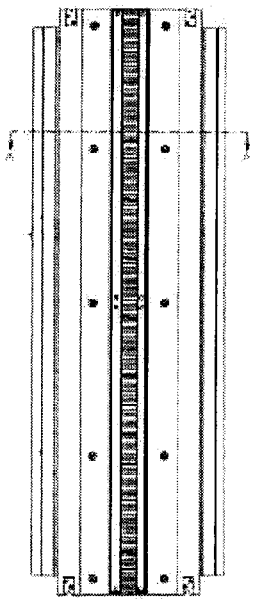
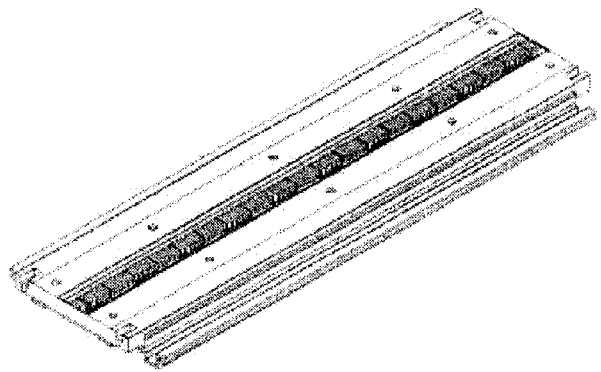
Figure 1a
Figure 1b
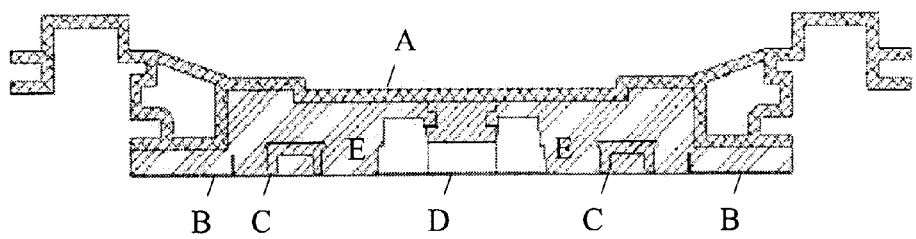
Section A-A
Figure 1c

Section A-A

Pockets shown at switch center house electrical components that are to be encapsulated in the switch module.

Electromagnetic switching coils.

Section C-C

Stator iron.

Fastening channels.

A feature such as this angle edge can be used to align motor stator iron in the manufacturing process.

MODULAR LINEAR MOTOR TRACKS AND METHODS OF FABRICATING SAME

This application claims the benefit of priority of U.S. Provisional Patent Application Serial No. 60/167,087, filed Nov. 23, 1999, and entitled "Methods and Apparatus for Assembling Linear Motor Tracks," the teachings of which are incorporated by reference.

BACKGROUND OF THE INVENTION

This invention pertains to vehicular and pallet transport and, more particularly, to methods and apparatus for the design and manufacturing of guideways for vehicles and pallets. The invention has application, for example, in track or guideway operated vehicular and pallet systems, e.g. in providing the operating guideway that defines the motion in an automation system. The invention has still more particular application, by way of non-limiting example, in linear motor propulsion guideways and/or guideways for magnetically guided vehicles.

Guideways currently in use are installed on site from their several individual components. These may provide guidance, propulsion, position sensing, communication and running surfaces for vehicles or pallets. For example, an electric train has rails that provide guidance and a running surface. It also has a separate overhead structure or third rail that can provide power. Also, there may be sensors near the rails that indicate to a central location the position of the train. Guideways with so many individual components are expensive to produce, deliver, install, and maintain.

The individual components can be expensive, for example, since they often have features that require very accurate assembly and adjustment at the installation site. Designing and manufacturing these features so that they insure proper operation of the assembled units, yet, with sufficient leeway to facilitate assembly under field conditions add to the cost of the parts.

Delivery of a transport system to the site where installation is planned involves many precision parts and tools. Various applications for transport systems require the guideways to be installed in clean or dirty environments, indoors or outdoors. Great care must be taken to account for parts and tools. Packaging and shipping many individual pieces and fasteners are examples of added cost to the system.

Installation of a transport system is time consuming for both the installer and the customer waiting to use the system. Transport systems arrive at the site of the installation in many pieces to be built in a non-integrated, "erector set" fashion. A fastening method is needed for mounting each of the components that provides guidance, propulsion, position sensing, communication and/or running surfaces for the vehicles and/or pallets. Jigs and fixtures are needed to measure positional accuracy of the separate components to ensure that the system will work properly. If components are out of alignment, adjustments need to be made. Personnel that install the system must be knowledgeable of the many individual components that are required. This increases the cost and complexity of the system and adds to the time needed for guideway installation.

For example, a typical pallet transport system is currently belt driven. A transport system that utilizes a belt method of propulsion has many moving mechanical parts (i.e. rollers, tensioners, drive wheels, etc.). Installation of typical belt driven transport systems requires a significant amount of adjustment, tensioning, and fastening of components. In practice, much of this setup and installation adjustment is subject to the interpretation of the installing technician. It can be a nonspecific and highly unrepeatable process.

Routine maintenance of the transport guideways is required. Mechanical parts and components have an expected service lifetime. If, however, adjustment of the parts is needed for installation, then there is always the possibility that the adjustment may slip or change during the life of the transport system causing the need for increased maintenance to ensure safety and prevent failure. Even during planned, routine maintenance, if servicing the guideway requires a technician (or more) to dismantle, replace, fixture, and adjust an "erector set" of parts, the time necessary to remove the transport system from service while maintenance tasks are performed is significant, costly, and complex (especially if adjustments are needed).

An object of the invention is to provide improved methods and design of guideways for vehicular and pallet transport systems.

Another object of the invention is to provide such methods and apparatus as can be applied to linear motor propulsion and/or magnetic guidance systems.

Another object of the invention is to provide such methods and apparatus as can be applied to reducing the manufacturing cycle time, complexity and cost of linear motor propulsion.

Another object of the invention is to provide such methods and apparatus as can be applied to the reduction of cycle time, complexity and cost of the maintenance and installation of a linear motor propulsion guideway.

Another object of the invention is to provide such methods and apparatus as can be applied to the mechanical packaging of the components of a linear motor propulsion guideway so as to improve positional accuracy of the components.

Another object of the invention is to provide such method and design of a guideway switch for vehicular and pallet transport systems.

SUMMARY OF INVENTION

The invention integrates linear motor propulsion into a guideway module that contains any combination of: linear motor propulsion, vehicle guidance, position sensing, communication, and vehicle or pallet running surface subcomponents.

One aspect of the invention integrates a combination of one or more subcomponents for linear motor propulsion, vehicle guidance, position sensing, communication, and vehicle or pallet running surfaces during the manufacturing of the guideway module. A single manufacturing operation can be used to position, affix, and encapsulate the selected subcomponent(s) in a module or modules. For example, the component(s) can be designed to be located in a plastic injection mold, typically, a reaction injection mold (RIM), which allows the subcomponent(s) to be positioned, aligned, and encapsulated in a single manufacturing step that has only a several minute cycle time. In this manner positional accuracy among the relationship of the subcomponent(s) can be maintained within a small tolerance (on the order of 0.25 mm) while costs remain very low.

Subcomponents are designed for integration into the guideway, either as a single encapsulated module or as separate but integrated units, thereby reducing the need to manufacture and ship many individual parts, fixtures, and fasteners to the site where the transport system is being installed. For example, the motor stator iron is segmented into blocks for use in both straight and curved modules. These stator iron blocks mount to a backplate for support and preliminary alignment during manufacturing. In a process such as RIM, the mold, as it closes, precisely aligns the stator iron blocks using features designed into the surface of the stator iron blocks. Where subcomponents are encapsulated as a single unit, the use of a backplate can have other integrated features as well. For example, it can provide support for the guidance channels prior to encapsulating the guideway module. It can also provide strength for the subcomponents during the encapsulating process so that the parts do not have to be designed as precision stand-alone components, thus reducing the cost of the subcomponents.

In a modular design of the guideway, a single manufacturing process such as encapsulating the components in a molding process allows for minimal treatment of surface finishes of the parts. For example, a molding material such as urethane, or epoxy fills the space between the components, forming the guideway. This encapsulates the components. Material that is injection molded around the component s will take the shape of the component, even if it is irregular. Once molded, the parts are sealed from the environment so that painting and plating are not necessary. This lowers the cost of the system and reduces the need for special handling of parts. Manufacturing motor subcomponents in this manner also provides the parts with a tolerance accuracy from the molding process that is suitable for installation registration without the need for additional surface machining or other expensive finishing of subcomponent surfaces.

Another aspect of the invention is the product design methodology that allows for the transport system to also be manufactured as independent subcomponents that can be installed with no adjustment unlike such current systems as belt driven transport or pallet systems. For example, if an existing transport system already has a method of position sensing, then just the linear motor propulsion subcomponent can be manufactured and used as a replacement for the inadequate existing propulsion method. Using similar manufacturing techniques as the modular guideway, the stand-alone individual subcomponent has a low cost mechanical packaging that incorporates manufacturing efficiencies such as, built in features of highly repeatable dimensional tolerances, integrated mounting features possibly molded during a RIM process, and little or no secondary surface finish operations.

Also, a customer may require that due to existing constraints, subcomponents must be installed in a diffuse manner. The stand-alone subcomponent allows the configuration to change if needed. For example, in the case where a pallet in a transport system is very small (200 mm by 200 mm square), there may only be enough space underneath the pallet for linear motor propulsion and position sense. If a subcomponent for guidance is required also, it would have to be located along the side edge of the pal let (for instance a roller coaster separates propulsion and guidance by having a center chain pull the cars up the first hill while the guidance wheels are separate at the outside of the cars).

Another aspect of the invention is the improvement of the efficiency of the manufacturing process and of the resulting module by integrating the functions of the parts. For example, in mounting the stator iron to the backplate, if the contact area between the two parts is great enough and can be maintained during the manufacturing process, then the backplate will function as a heat sink for the linear motor propulsion. Dissipating heat in this manner increases motor efficiency and eliminates the need for additional heat sink parts and assembly. Using an encapsulating material such as urethane in a molding operation to bond the subcomponents together allows the module be very rigid, drawing from the strength of the encapsulant, the guidance components, and the backplate. The components function as a single composite structure. Another integration advantage is that the components can have a common ground for static dissipation. Transportation vehicles and pallets moving over the guideway module surface will tend to build up a static charge due to the vehicular or pallet motion. The running surfaces, for example, could be electrically bonded to other components or directly to a backplate, which in turn, could be connected to a common grounding bus for the transportation system. In this way, the vehicle or pallet can be prevented from building a static charge that could cause damage to cargo or other peripheral devices.

Another aspect of the invention is to improve the transport switch. At the point in the guideway where the vehicle or pallet must merge from one guideway into another and conversely where a vehicle or pallet must diverge from one track to another, a section of guideway is needed that has the function of a switch. A switch requires additional subcomponents which cause the vehicle to follow the correct path enroute to a destination. The invention allows the integration of additional switching components into the modular guideway design. A switch guideway module, to the installation or maintenance technician, is not very different, except for shape, from other guideway modules.

Subcomponents for the switch are similar to other guideway modules, however there are also unique subcomponents that that facilitate the vehicle or pallet to move from one path to another. These subcomponents are integrated during the time of manufacturing. For example, using linear motor propulsion with any combination of one or more subcomponents, active guidance and power switching electronics can be encapsulated in the guideway module. This type of switch eliminates moving parts. It also simplifies the switch installation, and lowers the cost of the system. Integrating these specialized components into the guideway module reduces installation setup, training, maintenance, and complexity.

Another aspect of the invention is an integrated thermal expansion joint. Under various environmental conditions and routine use of the linear motor propulsion, temperature changes occur that cause the guideway subcomponents to expand and contract slightly (on the order of less than 5 mm for a 1.5 m guideway module). Features designed into the manufacturing process of the motor can allow a connection to be made from one guideway or one subcomponent of a guideway to the next based on the mounting requirements of the particular application of the guideway.

Other aspects of the invention are evident in the claims, in the drawings and in the description that follows.

BRIEF DESCRIPTION OF THE DRAWINGS

A more complete understanding of the invention may be attained by reference to the drawings, in which:

FIG. 1a depicts a guideway module according to the invention shown with the motor stator iron exposed down the center according to the invention. In this example many subcomponents are encapsulated into a single encapsulated module.

FIG. 1b is an isometric illustration of the guideway module of FIG. 1a shown with the motor stator iron exposed down the center according to the invention.

FIG. 1c illustrates the many integrated components in a single encapsulation inverted guideway module of the type shown in FIG. 1a.

DETAILED DESCRIPTION OF THE ILLUSTRATED EMBODIMENT

Figure 2A:
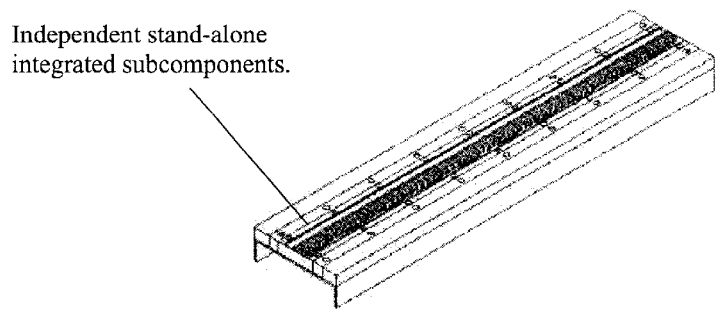
FIG. 2a depicts a guideway module according to the invention in which subcomponents are manufactured in a separate, but integrated configuration. Each subcomponent is a removable item.

A guideway for a vehicular and pallet transport system has a variety of features integrated into a modular design. These features can be internal to the final packaging of the guideway or can be external such as for subcomponent self-registration.

In FIGS. 1a and 1b a typical straight length of guideway with many encapsulated subcomponents is shown. Referring to FIG. 1A, "A" is a backplate, "B" are running surfaces for the wheels of a vehicle, "C" are guidance channels for a magnetically guided vehicle, "D" is motor stator iron, and "E" are the encapsulated areas that bond the subcomponents according to the invention.

The section view 1c shows the guideway in an inverted view (vehicle hanging from the track). Internal features shown include the items listed in FIG. 1c. Item "A" is a backplate component. A feature of the backplate is to provide strength for the guideway module, a structural backbone that helps resist twisting and deforming under load. It can also provide mounting points for attaching the guideway to the floor, ceiling, or other structure. The stator iron, item "D", is mounted directly to the backplate to allow heat transfer from the stator iron to the backplate for convection cooling of the guideway under operating conditions.

In this example, a vehicle using the guideway can have wheels. Item "B" shows running surfaces integrated into the guideway. In this view, the vehicle would be hanging from the track. The running surface can be made of a material such as stainless steel for durability, cleanliness, and static dissipation. Item "C" is an example of a guidance feature for a vehicle. In this case, a vehicle is magnetically guided and held within the surface area of the guideway. Item "C" illustrates a metal channel needed to complete the magnetic circuit of the vehicle guidance and it is embedded in the guideway. It is held rigidly and accurately (on the order of 0.1 mm) in place with no adjustments required.

Item "E" shows the material that encapsulates and holds the subcomponents in place. A variety of materials can be used for encapsulation based upon strength, environmental conditions, and cost. In this example a urethane material in a RIM process is used, though other techniques may be employed in alternate embodiments.

A RIM process of fabricating plastic parts is a common manufacturing technique. It is a closed mold, two part, injection molding process. Rim is particularly well suited for large structural parts that often require embedded or encapsulated structures. Polyurethane materials available to a RIM process have favorable characteristics for industrial applications (i.e. dimensional stability, chemical resistance, weather resistance, etc.).

A closed molding process in general provides a method of producing parts with a uniform surface finish, and a highly repeatable dimensional tolerance. When the RIM process is applied to the manufacturing of the guideway which may include any number of subcomponents or just the stand-alone linear motor propulsion, manufacturing assembly costs are reduced, manufacturing material costs are reduced, and due to the encapsulated nature of the guideway, installation adjustments, and therefore costs, are reduced.

Shown is item "C" completely encapsulated. Item "B" is held in place at the surface of the guideway module. Item "A" is partially encapsulated. The stator iron, Item "D", is partially encapsulated and is shown with an open area around much of the subcomponent. In this example, the motor electronics and windings will be added after the main structure of the subcomponents has been formed or encapsulated then the guideway is shipped to the installation site as a single piece. Using a manufacturing process such as RIM, the motor windings can also be included in the one-step manufacturing process (not shown).

Figure 2B:
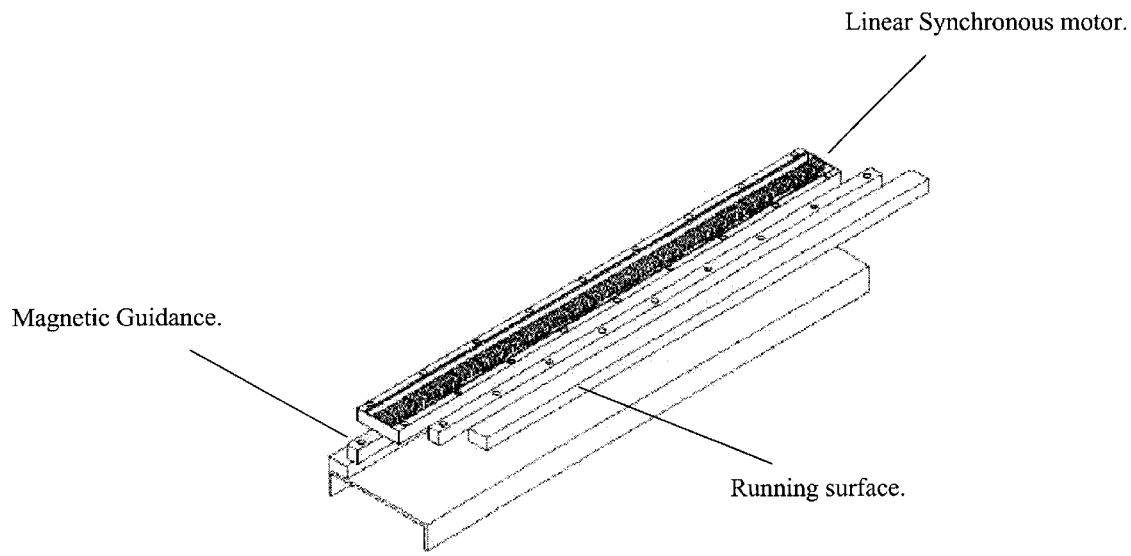
FIG. 2b illustrates an example of how only one or all of the module subcomponents can be encapsulated for ease of installation and subcomponent self-registration. Any of the subcomponents can be used independently, or in conjunction with other subcomponents.

In FIG. 2a a typical straight length of guideway with separate but integrated subcomponents is shown. In this example the subcomponents in FIG. 2a are shown mounted to an inverted "U" shaped mounting structure. FIG. 2b illustrates that subcomponents with different functions can be encapsulated independently but in a manner that reduces or eliminates adjustment or fixturing upon installation. In this example, FIG. 2b illustrates that each subcomponent (linear synchronous motor, running surface, and magnetic guidance for example) can be removed or mechanically disassociated from other subcomponents. The manufacturing process of the molding encapsulation of one or any number of subcomponents as integral units allows self-registration features accurate enough to facilitate a quick installation of the guideway at low cost with reduced mounting hardware or fasteners. Manufacturing subcomponents of a vehicular or pallet transport system in this manner also results in the easy removal of a subcomponent from an installed system should maintenance be required.

When subcomponents are shipped separately, registration features on the surfaces of the subcomponents or other external mounting and/or registration points can be used to insure proper placement of the subcomponents. Pockets can also be formed in the urethane, epoxy or other encapsuation materials to facilitate registration of subcomponents for assembly. The pockets can have any shape that permits assembly of the guideway without otherwise interfering with its installation or operation. An advantage of molding pockets and/or using registration geometry on the subcomponents is that essentially the cost is free. There is a capital tooling cost up front, but then there is no secondary machining step to make the feature.

To make the assembly accurate, subcomponents are aligned at three points (this makes a plane that is not over constrained). If a pocket is used, then the pocket can be designed such that three points on three different walls can be contacted. In some embodiments three bearings are molded in place that provide three contact points (a kinematic registration). If the application calls for a great deal of support of the subcomponents, more points of contact can be used and allowance made for the parts to deform slightly when the are attached. This would make the subcomponent less accurate, but much stronger.

Figure 3A:
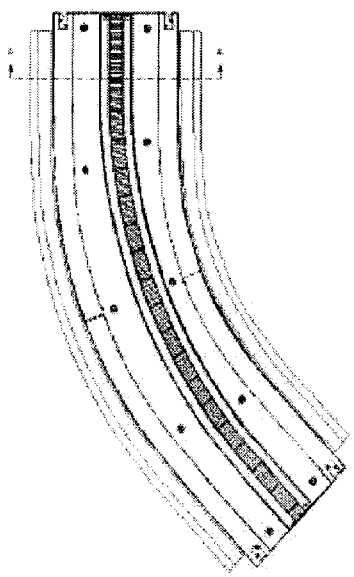
FIG. 3a depicts an example of a curved guideway module shown with the motor stator iron exposed down the center. Shown is an example of a 45° curve according to the invention. In this example many subcomponents are encapsulated into a single module.
Figure 3B:
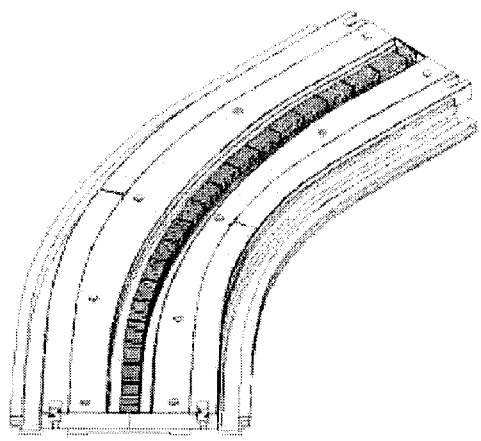
FIG. 3b is an isometric illustration of a typical curved guideway module shown with the motor stator iron exposed down the center according to the invention.
Figure 3C:
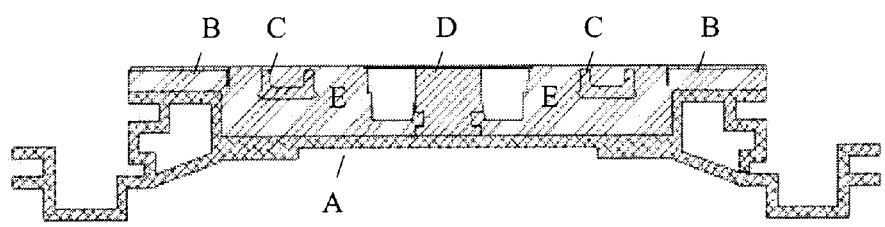
FIG. 3c illustrates the integrated components in a typical curved guideway module. "A" is a backplate, "B" are running surfaces for the wheels of a vehicle, "C" are guidance channels for a magnetically guided vehicle, "D" is motor stator iron, and "E" are the encapsulated areas that bond the subcomponents according to the invention.

An external feature of the guideway module is illustrated in FIGS. 3a, and 3b. In these figures an example of a guideway module shape is shown. Although many shapes possible, FIGS. 3a and 3b show a 45° curve . FIG. 3c illustrates the bcomponents of the curved guideway. The subcomponents are in the same relational sit-in to each other as in FIG. 1c.

Figure 4A:
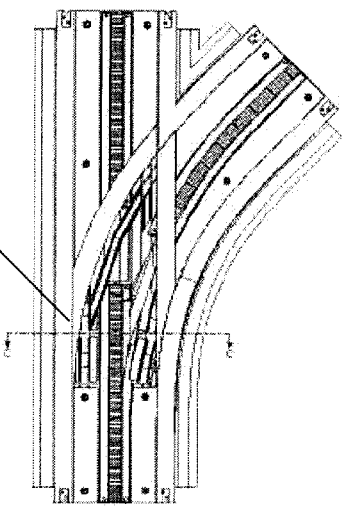
FIG. 4a depicts a switch module shown. In the illustration the motor stator iron is shown exposed according to the invention.
Figure 4B:
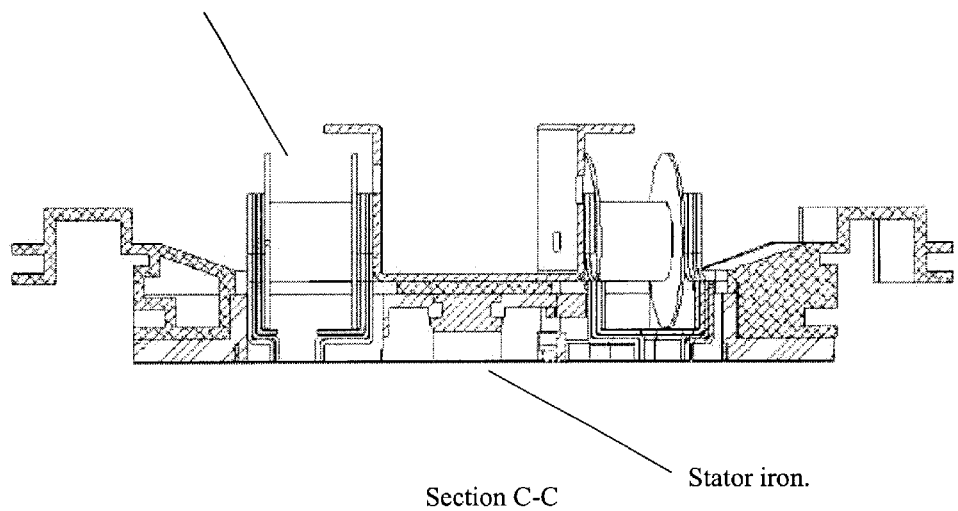
FIG. 4b is an isometric illustration of a typical switch module shown with the motor stator iron exposed down the center and also pockets are shown that house electronic components and is encapsulated during manufacturing to complete the switch module according to the invention. In this example several subcomponents such as electromagnetic guidance coils and heat sinks are encapsulated into a single module.

FIG. 4a is yet another example of a guideway module shape, a switch. The bcomponents shown in FIG. 4b are also in the same relative position as the previous samples. In this example subcomponents are molded together at the time of manufacture the guideway in FIG. 1.

The switch guideway module can encapsulate all the subcomponents necessary or routing a vehicle or pallet. For example, shown in FIG. 4a are several pockets near he center of the switch. It is in these pockets that switching electronics and guidance findings are encapsulated, prior to shipment to the installation site as a single piece. Using a manufacturing process such as RIM, these subcomponents can be part of a one-step manufacturing process (not shown). In most current vehicular and pallet transport systems switches are nonexistent due to the complexity of the mechanical components, especially when considering system installation and continued maintenance. The integrated switch guideway provides a low cost setup and reduced ongoing maintenance by the nature of the single piece, integrated design.

Manufacturing guideways as modules reduces the number of parts, fasteners, and fixtures that need to be shipped and installed on site. The guideway modules are self-contained. All of the subcomponents are, at least, partially encapsulated so that machining and coating finishes are not required on all subcomponent surfaces. One or all of the guideway subcomponents can be encapsulated together as a single unit. One or all of the guideway subcomponents can be encapsulated as separate units of an integrated module. And since all subcomponents are integrated into the guideway module, no adjustments nor installation of the subcomponents are required.

Figure 5:
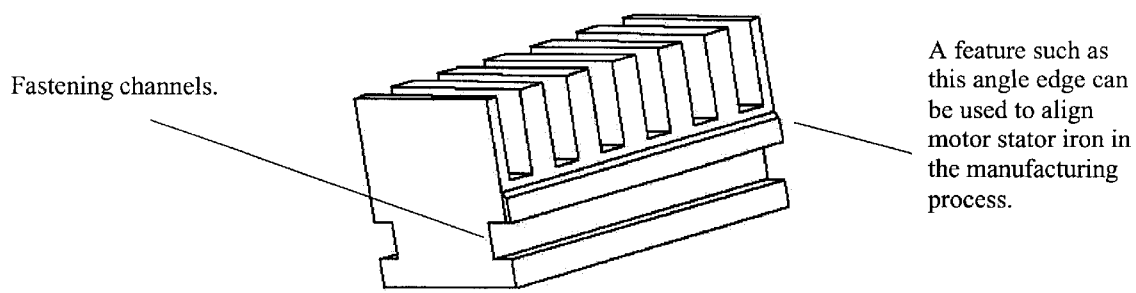
FIG. 5 is an illustration of a typical integrated stator iron component of the guideway module. "A" shows an alignment feature that a manufacturing process such as RIM could use to precisely guide and hold the part in place while the guideway module is being encapsulated according to the invention.

In FIG. 5 an example of subcomponent integration (in this case for manufacturing) into the guideway module is shown. A feature such as an angled surface serves to precisely position the subcomponent in x, y and z directions for a RIM manufacturing process. As the mold closes, a mating angled feature on the mold aligns the stator iron. Positional accuracy of better than 0.1 mm can be achieved routinely at a low cost. Also shown on the subcomponent are channels that run the length of the base of the stator iron. These allow the encapsulant a larger adhesion area and add strength to the guideway. Lastly, the base of the stator iron as shown provides a flat surface for thermal conduction. Heat from the motor in operation is dissipated to the backplate for convection cooling.

Figure 6:
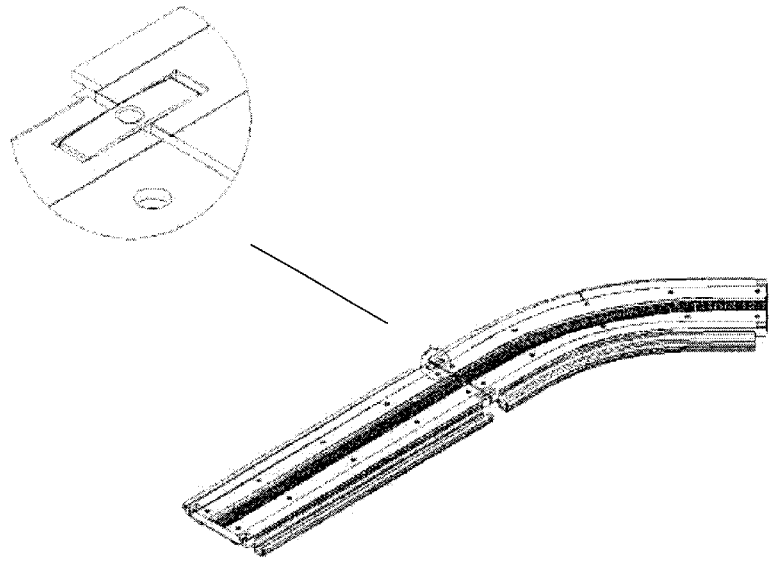
FIG. 6 is an illustration of an integrated alignment feature according to the invention.

Guideway modules are mounted in a transport system configuration that has a guideway module aligned end to end with another guideway module. There is a gap between the two guideways to allow clearance for thermal expansion. FIG. 6 illustrates the position of two guideway modules after installation. In normal operation of linear motor propulsion, the guideway will expand and contract due to thermal cycling of the guideway materials. FIG. 6 shows a typical alignment feature that can be molded into the guideway during manufacturing. The integration of the accurate pocket with respect to the running surface is a very low cost feature when using the accuracy of a mold, as in a RIM process, to form the part.

Figure 7:
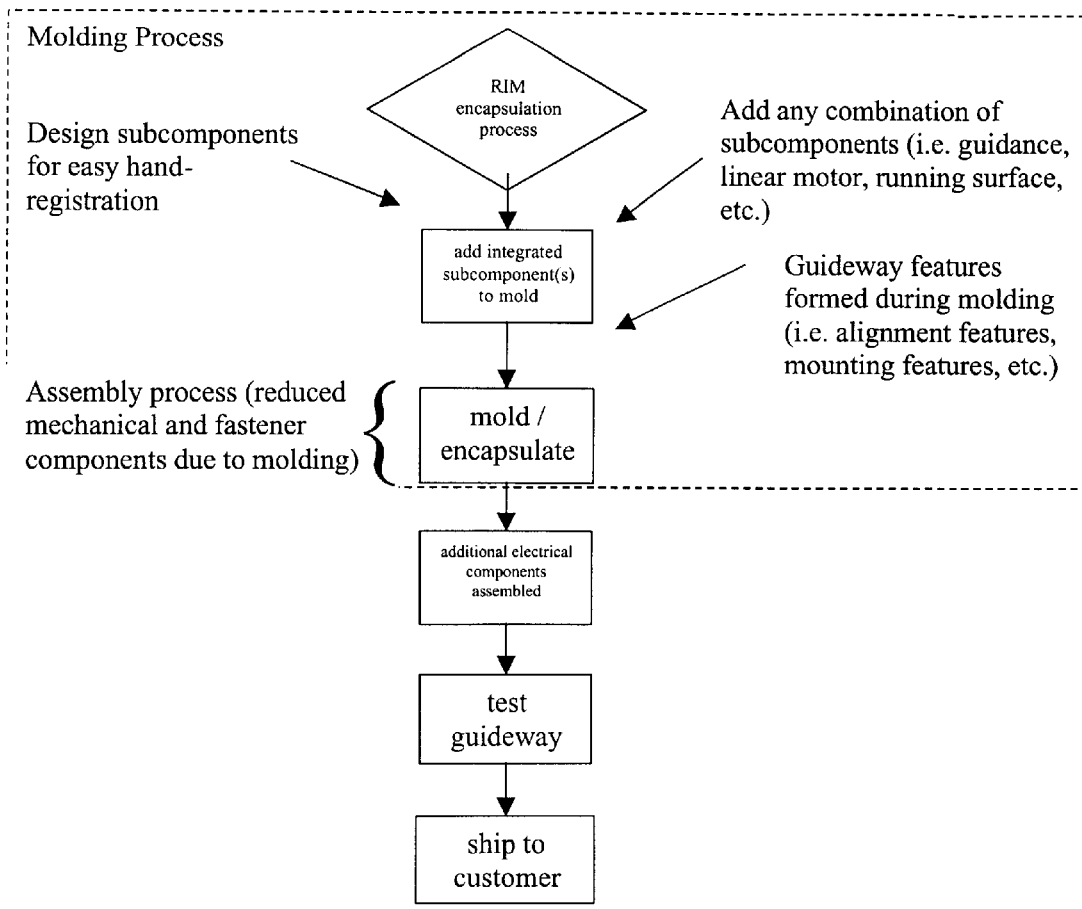
FIG. 7 depicts a RIM molding process of the type used in practice of the invention.

A RIM process of the type used in practice of the invention is given in FIG. 7. The Molding Process box shown (inside the dashed area) provides cost and time efficiencies which allow the linear motor guideway to be an alternative source of propulsion in many motion system solutions. In the molding process, alignment features, mechanical registration geometry, and surface finish requirements are formed (at little additional cost above the general mold cost). Also mounting features such as threaded inserts, bushings and other attaching hardware are molded in place, which significantly reduces, or completely eliminates, the need for secondary machining of the guideway. Another function of the Molding Process area is the alignment and encapsulation of the subcomponents. Positional accuracies of less than ½ " and, more specifically, on the order of 0.25 mm are maintained using bushings and guide pins in the mold to position and hold the components during the encapsulation process.

Designing the subcomponents with a point or points that locate the part in three axis while it is in the mold eliminates much clamping, adjusting, and featuring that is required in alternative methods of manufacturing. Also, in manufacturing guideways that have many subcomponents molded together, it is critical for shrinkage characteristics (tolerance budgeting) and internal stress buildup that the components are made of materials with similar thermal expansion rates or are designed in such a manner that this is not a problem. For instance, a subcomponent that expands or shrinks more rapidly than the encapsulant may need to be constrained by thick walls of encapsulant so as to prevent deformation or cracking of the finished part.

Also, in FIG. 7, at the point of adding subcomponents into the process flow, the number of subcomponents can be one or many (with the mold designed appropriately). For example, if an application calls for a combination of linear motor propulsion, guidance, run surfaces, and a backplate, all the subcomponents can be very accurately positioned, and affixed in place by molding the complete guideway. However, for example, if the application calls for only linear motor propulsion, then only the linear motor will be designed for the molding process. Alternatively, for example, if the application calls for linear motor propulsion with separate but integrated subcomponents (for modular maintenance replacement of subcomponents) then subcomponents such as guidance, and run surfaces can be molded in separate molding processes that affords the parts accurate, similar, and low cost alignment and mounting features.

Guideway modules according to the invention may be of any size convenient for transport to, and assembly at, an installation site (e.g., an airport, amusement park, metropolitan or urban transportation zone). Smaller modules are advantageous insofar as they can be more easily shipped. Large modules are advantageous insofar as fewer are required to span a distance and insofar as they can be assembled with fewer joints. Preferred modules for use in a small parts manufacturing environment are between 0.25 and 5 meters. Those skilled in the art will, of course, appreciate that modules of other sizes will be better suited in other environments.

A further understanding of the functions and overall design of subcomponents discussed herein may be attained by reference to U.S. Pat. No. 6,011,508 and 6,101,952, as well as to copending, commonly assigned U.S. patent application Ser. Nos. 09/609,124, filed Jul. 3, 2000, the teachings of all of which are incorporated herein by reference.

Described above are methods and apparatus meeting the desired objects, among others. Those skilled in the art will appreciate that the illustrated embodiments are examples of the invention and that other embodiments incorporating modifications thereto may fall within the scope of the invention, of which we claim:

What is claimed is:

1. A module adapted for use in on-site assembly of a linear motor propulsion guideway for a vehicle or pallet, the module being a product of a process that includes the steps of at least temporarily supporting one or more subcomponents on a backplate, closing an injection mold on or about the backplate and the one or more subcomponents, aligning the one or more subcomponents via cooperation of features on the subcomponents and features on the mold, injecting a molding material into the mold so as to encapsulate and affix the subcomponents into operative relationship with one another, and removing the mold, wherein the one or more subcomponents are stator iron blocks.

2. A module adapted for use in on-site assembly of a linear motor propulsion guideway for a vehicle or pallet, the module comprising a plurality of subcomponents encapsulated in an encapsulation material and, thereby, affixed into an operative relationship to one another for purposes of transport to an assembly site and for installation for operation, the plurality of subcomponents selected from a group consisting of a linear motor subcomponent, a vehicle guidance component, a position sensing component, and a communications component, the encapsulation material comprising any of a plastic and an epoxy, wherein one or more of the subcomponents are electrically coupled to one another.

3. A module according to claim 2, wherein the module comprises all or a portion of a switching section of the guideway.

4. A module according to claim 3, wherein the plurality of subcomponents are selected from a group additionally consisting of active power and guidance switching electronics.

* * * * *

UNITED STATES PATENT AND TRADEMARK OFFICE
CERTIFICATE OF CORRECTION

PATENT NO.    : 6,578,495 B1
DATED         : June 17, 2003
INVENTOR(S)   : Anthony M. Yitts and Alastair D. Taylor It is certified that error appears in the above-identified patent and that said Letters Patent is hereby corrected as shown below:

<u>Title page,</u>
Item [75], Inventor, change "Anthony A. Yitts" to read -- Anthony M. Yitts --

Signed and Sealed this

Twenty-third Day of September, 2003

JAMES E. ROGAN
*Director of the United States Patent and Trademark Office*